Sept. 2, 1952          J. F. JOY          2,608,779
ORNAMENTAL DISPLAY DEVICE
Filed May 11, 1948          2 SHEETS—SHEET 1
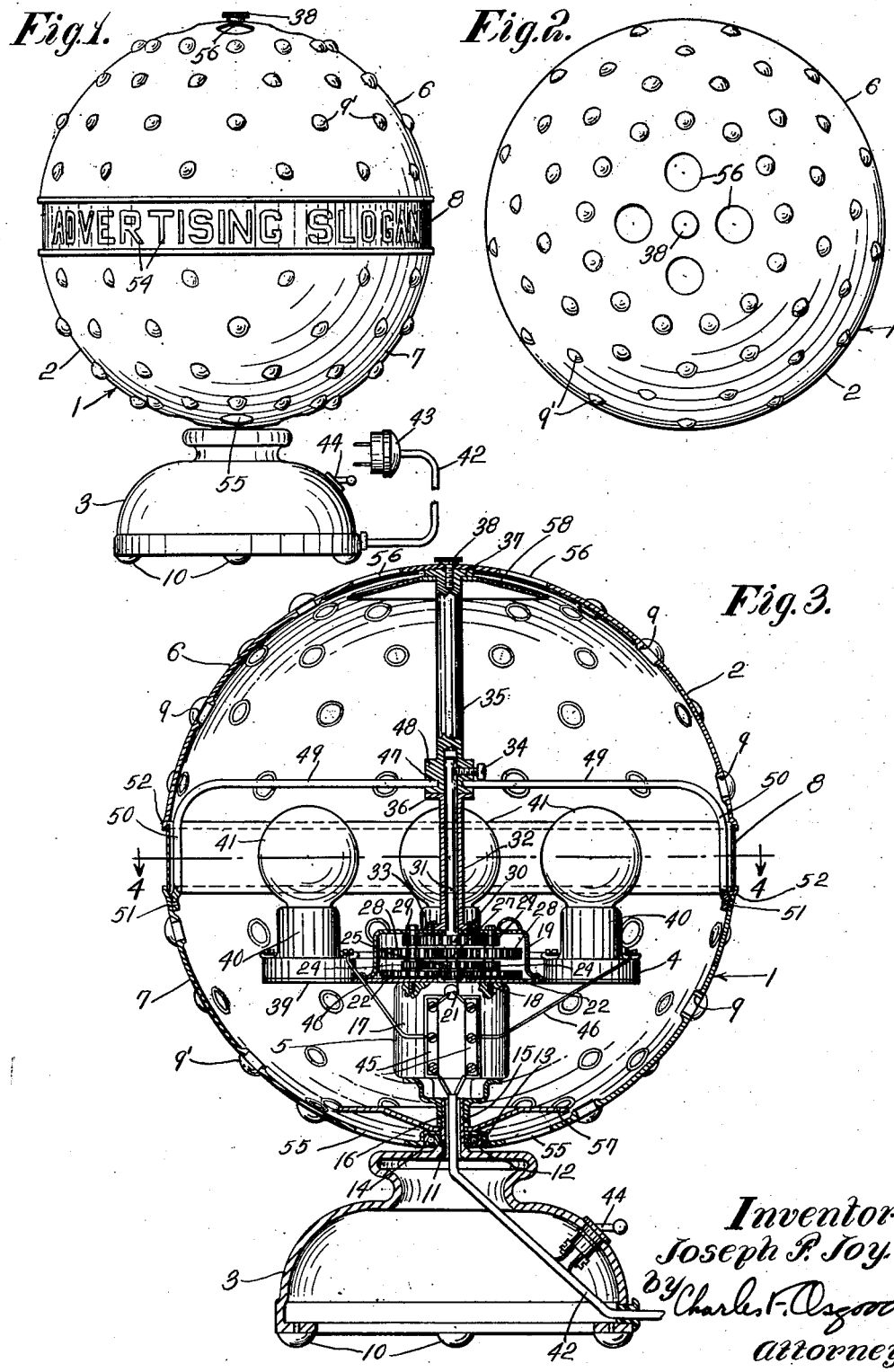
Inventor:
Joseph F. Joy.
by Charles F. Osgood,
attorney.

Sept. 2, 1952 J. F. JOY 2,608,779
ORNAMENTAL DISPLAY DEVICE
Filed May 11, 1948 2 SHEETS—SHEET 2
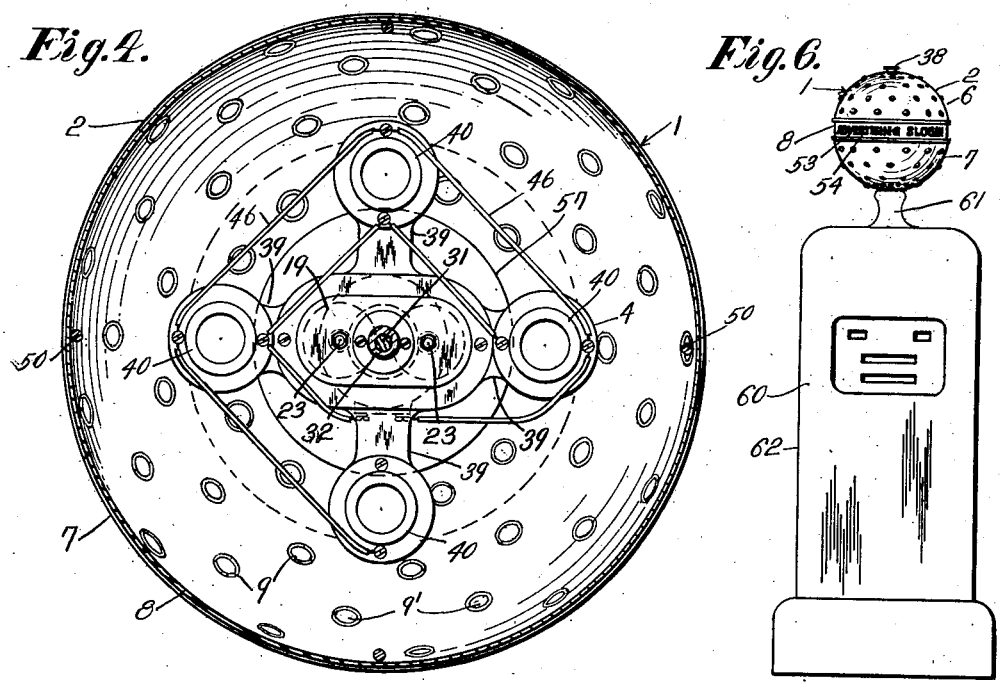
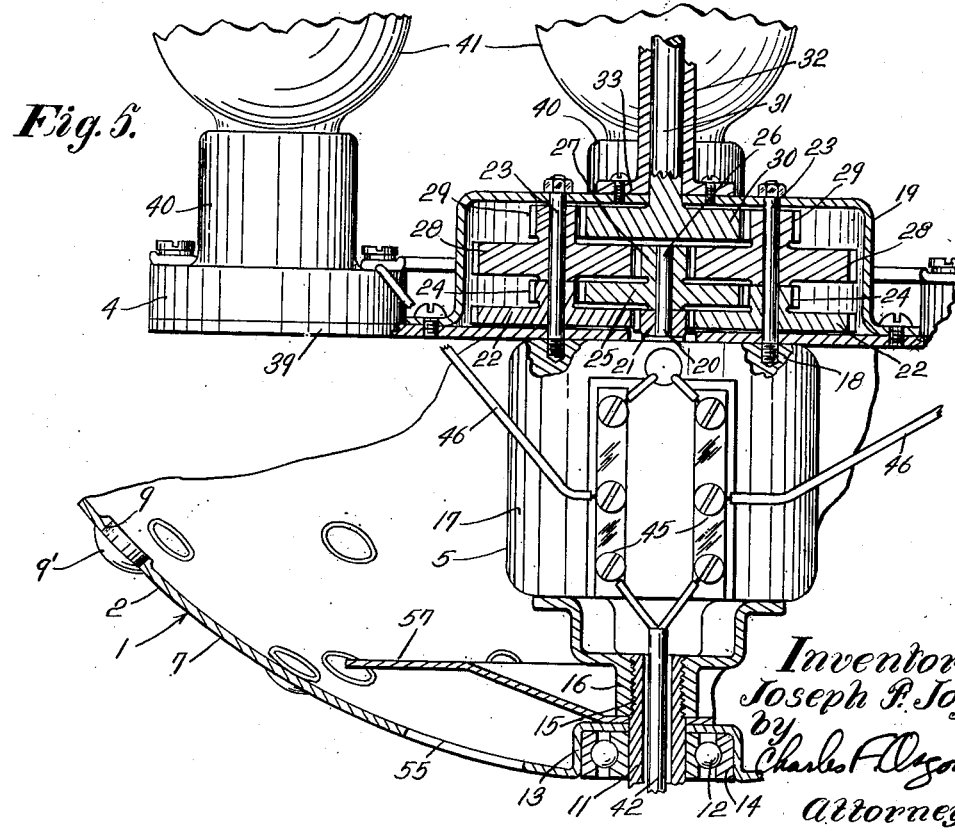
Inventor:
Joseph F. Joy,
by Charles F. Osgood,
Attorney.

Patented Sept. 2, 1952

2,608,779

UNITED STATES PATENT OFFICE 2,608,779

ORNAMENTAL DISPLAY DEVICE

Joseph F. Joy, Pittsburgh, Pa., assignor to Joy Manufacturing Company, Pittsburgh, Pa., a corporation of Pennsylvania Application May 11, 1948, Serial No. 26,322

11 Claims. (Cl. 40—77)

This invention relates to an ornamental display device for use wherever an ornamental display of animated brilliancy is desired and more particularly to an electrical display sign for advertising purposes.

The invention has plural aspects and, from one aspect, relates to an ornamental display of animated brilliancy which is colorful, attractive and spectacular. From another aspect, the invention relates to an electrical advertising display which may embody a slowly revolving globe or sphere simulating the world as it would appear turning on its own axis and having an internal source of illumination and internal mechanism for rotating the same. The sphere may have jewellike windows or transparent lenses which may assume the form of faceted elements of glass or translucent plastic material through which light may pass to provide a spectacular display of colored light rays, and an advertising slogan, consisting of a band with lettering, may extend around the equatorial line of the sphere and have cut out or translucent letters to permit the passage of light therethrough for easy reading as the sphere slowly revolves on its axis. While revolving illuminated displays are generally well known, the present invention contemplates improvements over known devices in that it embodies novel structural features and arrangements, resulting not only in a spectacular display and improved appearance and extreme compactness but also simplifying manufacture and facilitating assembly and dismantling of the parts.

An object of this invention is to provide an ornamental display having novel features of construction. Another object is to provide an improved ornamental display device of animated brilliancy which is colorful, attractive and spectacular. A further object is to provide an improved ornamental display device for advertising purposes. Yet another object is to provide an improved ornamental display device embodying a revolving globe simulating the world and having an internal source of illumination and provided with numerous jewellike windows or transparent lenses which may be faceted and of different colors so as to permit the light to pass therethrough so that the jewellike lenses reflect the light as the globe revolves, to provide constantly scintillating rays of light to create a vivid, dazzling, animated effect. A further object is to provide an improved advertising display device comprising a revolving globe simulating the world and having an internal source of illumination and provided with a display sign or slogan extending around the equatorial line of the globe and having cut out or translucent letters through which light passes so that as the globe revolves, the sign or slogan may be easily read. Still another object is to provide an improved globular display sign having novel, extremely compact mechanism arranged within the globe for slowly revolving the latter about an upright axis. A still further object is to provide a revolving display sphere constructed in a novel manner and having an improved bearing mounting. Yet another object is to provide a novel mounting for the light source within the globe. A still further object is to provide improved cooling means for the internally illuminated sphere. These and other objects of the invention will, however, hereinafter more fully appear.

In the accompanying drawings there are shown for purposes of illustration one form and a modification which the invention may assume in practice.

In these drawings:

Fig. 1 is a side elevational view of a display device constructed in accordance with one illustrative embodiment of the invention.

Fig. 2 is a top plan view of a display device shown in Fig. 1.

Fig. 3 is an enlarged central vertical sectional view, with parts shown in full, taken through the display device shown in Figs. 1 and 2.

Fig. 4 is a horizontal sectional view taken substantially on line 4—4 of Fig. 3, with the light bulbs removed.

Fig. 5 is an enlarged fragmentary sectional view taken on the plane of Fig. 3, showing details of construction.

Fig. 6 is a side elevational view illustrating a modification, with the display device associated with a filling station gasoline pump.

In the illustrative embodiment of the invention shown in Figs. 1 to 5 inclusive, the improved display device is generally designated 1 and generally comprises a revolving globe or sphere 2 simulating the world and mounted to turn about an upright axis on a base 3. The globe or sphere contains an internal source of illumination 4 and driving mechanism 5 for rotating the globe or sphere. The globe or sphere is preferably made up of two partial or incomplete hemispheres or globe sections 6 and 7 and an intermediate annular strip or band 8, with the parts 6, 7 and 8 so cooperating as to provide the complete sphere.

The glove sections 6 and 7 are perforated by numerous suitably spaced openings 9 in which are fitted jewellike windows or lenses 9' which may be formed with facets for reflecting the light rays passing through the windows or lenses. The lenses may be of plastic or glass or other transparent substance, and may be all of the same color or of different colors, as desired. If desired, the openings 9 and lenses 9' may be omitted and the globe sections may be composed of transparent material such as translucent plastic.

The base 3 is preferably of generally circular form and has feet 10, preferably of rubber or like resilient material, and is formed with a centrally located upstanding tubular pedestal or shaftlike element 11 which is surrounded by and supports a ball thrust bearing 12. The lower globe section 7 has, at its bottom, a cuplike portion 13 providing a circular recess 14 for receiving the thrust bearing, with the latter so arranged that it centers the globe on the base, receives the weight of the globe, and provides a bearing mounting therefor. The upper portion of the tubular element 11 is threaded at 15 and has threadedly secured thereto a support 16 which carries a motor 17. The motor is preferably an electric motor and is arranged in a vertical position on the support, with its axis preferably coincident with the axis of rotation of the globe. The motor has a casing 18 which has attached to its upper end a transverse gear housing 19 which may be sealed to contain a suitable lubricant. Fixed to the upper end of the motor shaft 20 is a spur pinion 21 meshing at its opposite sides with large spur gears 22, herein preferably journaled on vertical bolts 23 which serve to secure the gear housing to the motor casing. Herein formed integral with the gears 22 are small spur gears 24 which mesh with the opposite sides of a large spur gear 25 preferably journaled on an elongation 26 of the motor shaft. Integral with the gear 25 is a small spur gear 27 meshing at its opposite sides with large spur gears 28, herein likewise journaled on the bolts 23. Integral with the gears 28 are small spur gears 29 meshing with the opposite sides of a large spur gear 30 secured to a vertical shaft 31 extending upwardly axially through and journaled on an upright tubular support or column 32. Thus a large speed reduction is provided between the motor shaft and the shaft 31 so that the latter may rotate relatively slowly. The tubular support or column 32 has a flanged base portion 33 secured, as by screws, to the top of the gear housing 19. As shown in Fig. 3, secured as by a set screw 34 to the upper end of the shaft 31 is an upright driving and supporting element 35 herein resting on the flanged upper end 36 of the tubular support 32. The element 35 has a flanged upper end 37 on which the upper globe section 6 rests, and a thumb screw 38, having a knurled handle, is threaded within the upper portion of the element 35 for firmly and detachably securing the upper globe section in position thereon.

The gear housing 19 has integral brackets 39 at the sides thereof carrying conventional sockets 40 for electric light bulbs 41 which provide the source of illumination within the globe. A conductor wire 42 having a usual connector plug 43 leads into the base, and the base carries a switch 44 for turning the power off and on. The wiring leads up through the base and through the tubular element 11 to the wiring connections 45 of the motor. Wires 46 also lead from the wiring to the light bulb socket contacts in a usual manner. When the plug 43 is connected to a suitable source of electricity and the switch 44 is on, the globe is internally illuminated and is slowly rotated by the motor 17, as hereinafter described.

Secured at 47 to the enlarged base portion 48 of the driving element 35 and supported by the tubular support 32 are armlike brackets 49 having downwardly bent outer end portions 50 secured at 51 as by screws to the lower globe section. The brackets 49 provide radial driving arms for the globe. The adjacent edges of the globe sections have annular lips 52, and the annular strip or band 8 is located intermediate the globe sections and cooperates with the latter in completing the sphere. The lips 52 serve to retain the band in position between the globe sections. The band extends around the equatorial line of the sphere in the transverse zone of the light bulbs to attain effective lighting and may have cut out or translucent letters 54 providing a sign or slogan for advertising purposes, and the light may pass through the letter cut-outs or the translucent lettering to enable easy reading of the sign or slogan as the globe slowly revolves. If desired, the band may be of suitable translucent material with solid lettering, in an obvious manner.

By removing the thumb screw 38, the upper globe section 6 may be readily lifted from the support 38 away from the lower globe section 7 to enable removal or replacement of the sign or slogan and to attain access to the internal mechanism of the display.

Cooling air is circulated through the globe to carry away heat generated by the light bulbs, and the bottom of the lower globe section 7 has air inlet openings 55 while the top of the upper globe section 6 has air outlet openings 56. Preferably clamped between the upper surface of the cup-shaped portion 13 and the lower end of the support 16 is an inverted metal shade 57 overlying the openings 55 to impede the passage of light therethrough while permitting free air flow. Secured to the bottom of the flanged upper end 37 of the element 35 is a metal shade 58 underlying the openings 56 for likewise impeding the passage of light therethrough while permitting air flow. Thus the cooling air may circulate freely by convection through the openings 55 upwardly through the interior of the globe and outwardly through the top openings 56.

In the modification shown in Fig. 6, the improved display device is associated with a filling station gasoline pump 60. In this construction, the base 3 of the embodiment above described is omitted and an upstanding portion 61 at the top of the pump casing 62 provides the bottom support of the device. The revolving globe structure, its internal driving mechanism and the internal source of illumination are the same as those above described. Evidently, the display device may be associated with other forms of apparatus wherever a brilliant animated display is desired.

As a result of this invention, an improved ornamental display device of animated brilliance is provided which is colorful, attractive and spectacular, quickly attracting the attention of an observer. It will further be evident that an improved advertising display device is provided which, due to its revolving illuminated parts with jewel-like lenses, readily attracts attention by its colorful scintillating light rays. By arranging the source of illumination and the driving mechanism for rotating the globe internally of the globe so that the latter provides a housing therefor, compactness and improved appearance are attained. By the provision of the sphere constructed in the manner disclosed, assembly and dismantling of the device is facilitated and the advertising band may be readily inserted and replaced. As a result of the novel structural elements of the display device, manufacture is simplified and cost is maintained at a minimum. These and other advantages of the invention will be clearly apparent to those skilled in the art.

While there are in this application specifically described one form and a modification thereof which the invention may assume in practice, it will be understood that this form and modification of the same are shown for purposes of illustration and that the invention may be further modified and embodied in various other forms without departing from its spirit or the scope of the appended claims.

What I claim as new and desire to secure as Letters Patent is:

1. In a display device, a base, a revolving globe comprising a partial upper globe section, a partial lower globe section and a band intermediate said sections and cooperating therewith to complete the globe, means for mounting said globe for rotation about an upright axis on said base, said mounting means including a central support carried by said base, armlike brackets secured to said central support and secured at their outer ends to said lower globe section and an upper support portion between said central support and said upper globe section, said brackets and said upper support portion supporting said globe sections with their adjacent edges in fixed spaced apart relation, and said band supported entirely by said globe sections between said spaced adjacent edges, and means for detachably securing said upper globe section to said upper support portion whereby said upper globe section may be raised to move said spaced edges further apart to permit removal of said band.

2. In a display device, a base, a pedestal mounted on said base and supporting a bearing, a spaced bearing, supporting means for said second bearing including a motor casing supported by said pedestal and a member carried by said motor casing and supporting said second bearing, a housing rotatably supported by said bearings, and means within said rotatable housing for driving the latter including a rotating motor element within said motor casing and reduction gearing having a terminal gear element coaxial with said bearings and a vertical shaft driven by said gear element and connected to said rotatable housing.

3. In a display device, a base, a pedestal mounted on said base, a motor having a casing and supported by said pedestal with its axis in alignment with the axis of said pedestal, a pinion driven by said motor, a gear casing fixed to said motor casing, a column fixed to the upper side of said gear casing, bearings respectively supported by said column and between the ends of said pedestal, a globe supported by said bearings and enclosing within it said gear casing and motor, a gear fixed in coaxial relation with said pedestal to said globe and gearing journaled in said gear casing for transmitting drive from said pinion to said gear.

4. In an illuminated display device, a base, an internally illuminated sphere, means for mounting said sphere on said base for rotation about an upright axis, said sphere having translucent portions through which light rays are adapted to pass, a source of illumination within said sphere, said mounting means including a tubular support arranged within said sphere in axial alignment with the axis of sphere rotation, and motor driven means supported by said base and arranged within said sphere for rotating the latter, said motor driven means including an upright drive shaft arranged coaxial with and rotatably mounted within said tubular support, the upper portion of said shaft projecting upwardly and terminating above said tubular support, and means for operatively connecting the upper end of said shaft to said sphere within the latter.

5. In an illuminated display device, a base, an internally illuminated sphere having translucent portions through which light rays are adapted to pass, a source of illumination within said sphere, said sphere comprising a bottom part and a removable upper part, means on said base for mounting said sphere for rotation about an upright axis including a tubular support axially aligned with the axis of sphere rotation and lateral supports engaging said tubular support and connected to said lower sphere part, motor driven means supported by said base and arranged within said sphere for rotating the latter, said motor driven means including an upright drive shaft arranged coaxial with and supported within said tubular support and connected to said lateral supports for rotating the latter relative to said tubular support, said shaft supporting said upper sphere part, and a releasable connection between said drive shaft and said upper sphere part.

6. In an illuminated display device, a base, a hollow sphere mounted on said base for rotation about an upright axis and having translucent portions through which light rays are adapted to pass, a source of illumination within said sphere, and motor driven means for rotating said sphere including an upright drive shaft arranged within said sphere with its axis in the same straight line with the axis of sphere rotation, mounted means supported by said base and arranged within said sphere and by which said shaft is rotatably supported, the upper end of said shaft projecting upwardly and terminating above said mounting means, and an operative driving connection between the upper portion of said upright shaft and said sphere also arranged within the latter.

7. In an illuminated display device, a base, a hollow sphere mounted on said base for rotation about an upright axis and having translucent portions through which light rays are adapted to pass, said sphere comprising separable upper and lower portions which are separable to provide access to the interior of said sphere, a source of illumination within said sphere, motor driven means for rotating said sphere including an axial upright drive shaft arranged within said sphere, mounting means supported by said base and arranged within said sphere and by which said shaft is rotatably supported, a lateral driving connection between said shaft and said lower sphere portion, and a releasable driving connection between the upper portion of said shaft and said upper sphere portion whereby said upper sphere portion may be detached without disturbing the relation of said lower sphere portion with respect to said lateral driving connection.

8. A device of the character set forth in claim 7 wherein said mounting means includes a tubular support surrounding said shaft and said driving means for said sphere includes a part for supporting said upper sphere portion and rotatably supported by said tubular support, said rotatably supported part being detachably secured to said shaft.

9. In a display device, a base, a revolving globe comprising partial upper and lower globe sections and an intermediate band cooperating with said sections to complete the globe, means for mounting said globe on said base for rotation about an upright axis including supports arranged within said globe for supporting said upper and lower globe sections with their adjacent edges spaced apart, and means provided at said adjacent edges of said globe sections and spaced apart a greater distance than the width of said band whereby the latter may be loosely received and supported between said globe sections, said globe sections when assembled on said supporting means providing the sole support for said band, and means for driving elements of said mounting means to effect rotation of said assembled globe.

10. A display device of the character set forth in claim 9 wherein said mounting means includes an upright rotatable axial support arranged within said globe and having connection with said upper globe section and driven by said driving means, and lateral supporting elements secured to said axial support and secured at their outer ends to said lower globe section.

11. In a device of the character disclosed, a motor driven globe rotating about a substantially upright axis, said globe comprising an incomplete top hemispherical portion, an incomplete bottom hemispherical portion and a removable slogan-bearing band arranged between said portions and cooperating therewith to complete the globe, means for mounting said globe for rotation about said substantially upright axis including rotatable supports for said hemispherical portions for supporting the latter with their adjacent edges in fixed spaced relation, and said edges supporting means for receiving and supporting said band whereby the latter is solely supported by said hemispherical portions, and said mounting means for said hemispherical portions including a releasable connection permitting complete separation of said portions whereby said band may be inserted therebetween or removed therefrom.

JOSEPH F. JOY.

REFERENCES CITED

The following references are of record in the file of this patent:

UNITED STATES PATENTS

| Number | Name | Date |
|---|---|---|
| 935,236 | Saunders | Sept. 28, 1909 |
| 1,014,958 | Edison | Jan. 16, 1912 |
| 1,621,344 | Addleburg et al. | Mar. 15, 1927 |
| 1,740,845 | Tilbe | Dec. 24, 1929 |
| 1,759,789 | Howard | May 20, 1930 |
| 1,975,592 | Solodar | Oct. 2, 1934 |
| 2,102,550 | Treesh | Dec. 14, 1937 |

FOREIGN PATENTS

| Number | Country | Date |
|---|---|---|
| 342,532 | Great Britain | Feb. 5, 1931 |